Oct. 10, 1961

J. FIGARETTI 3,003,394

APPARATUS FOR PROJECTING INDICIA IN SERIES AT TIMED INTERVALS

Filed Nov. 17, 1959

3 Sheets-Sheet 1

INVENTOR.
JACK FIGARETTI,
BY
Linton and Linton
ATTORNEYS.

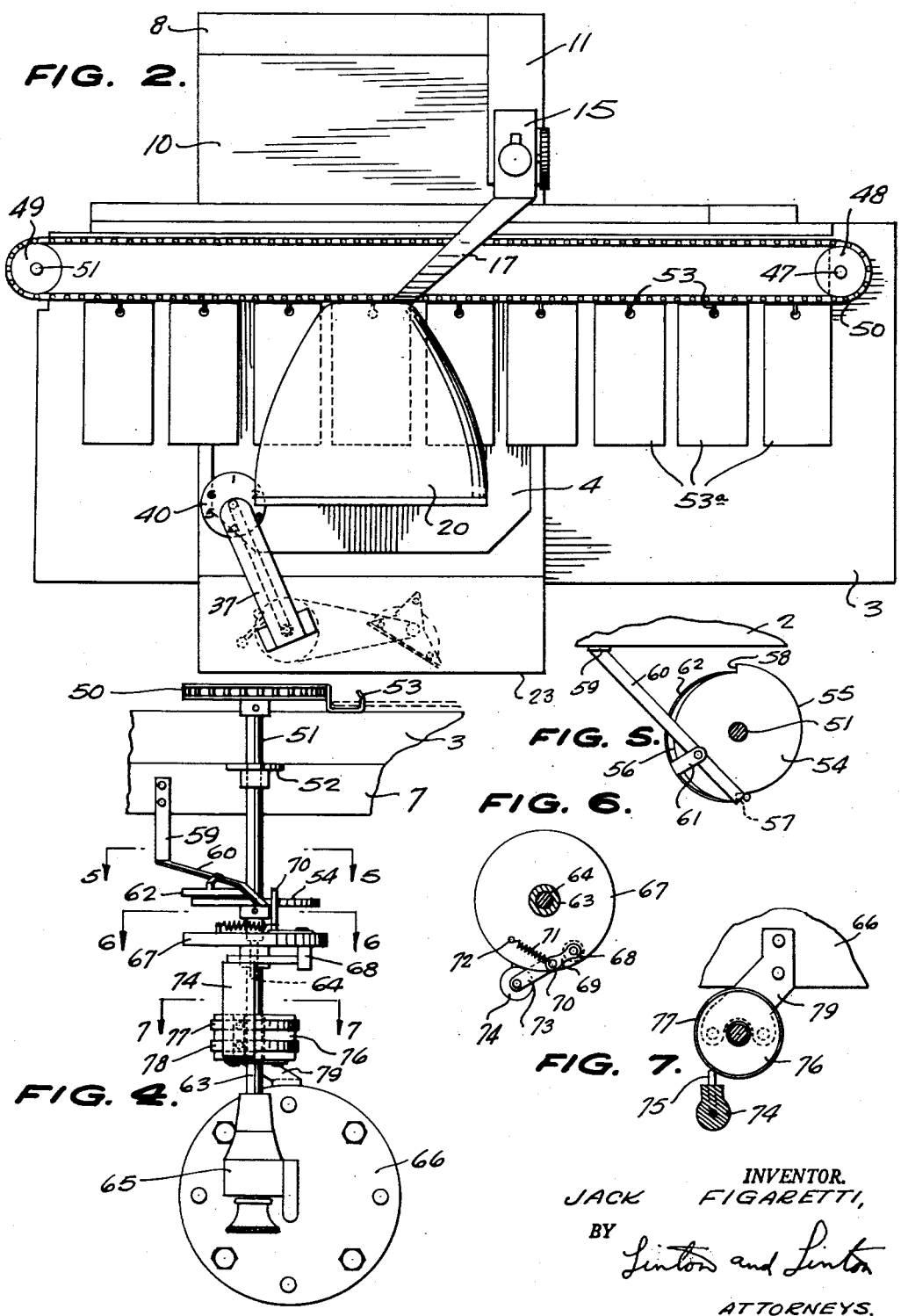

Oct. 10, 1961  J. FIGARETTI  3,003,394
APPARATUS FOR PROJECTING INDICIA IN SERIES
AT TIMED INTERVALS
Filed Nov. 17, 1959  3 Sheets-Sheet 3
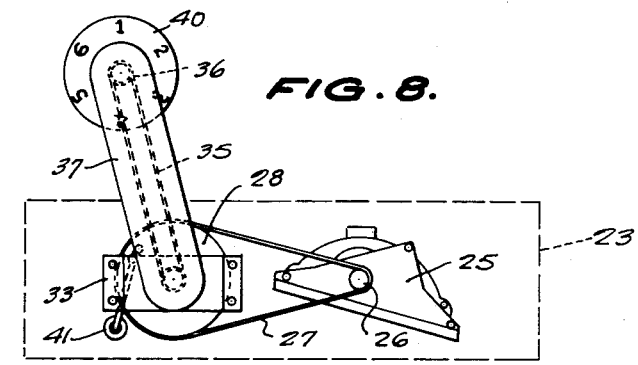
FIG. 8.
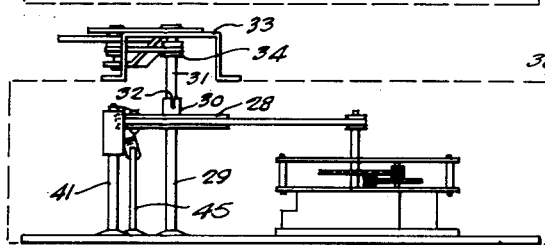
FIG. 9.
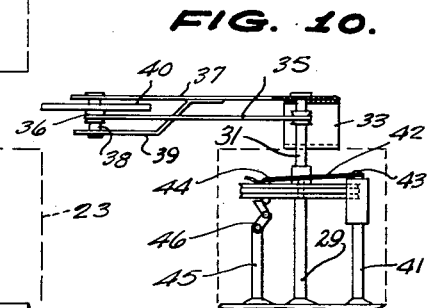
FIG. 10.
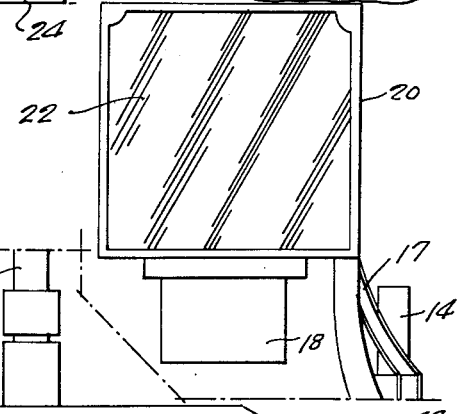
FIG. 3.
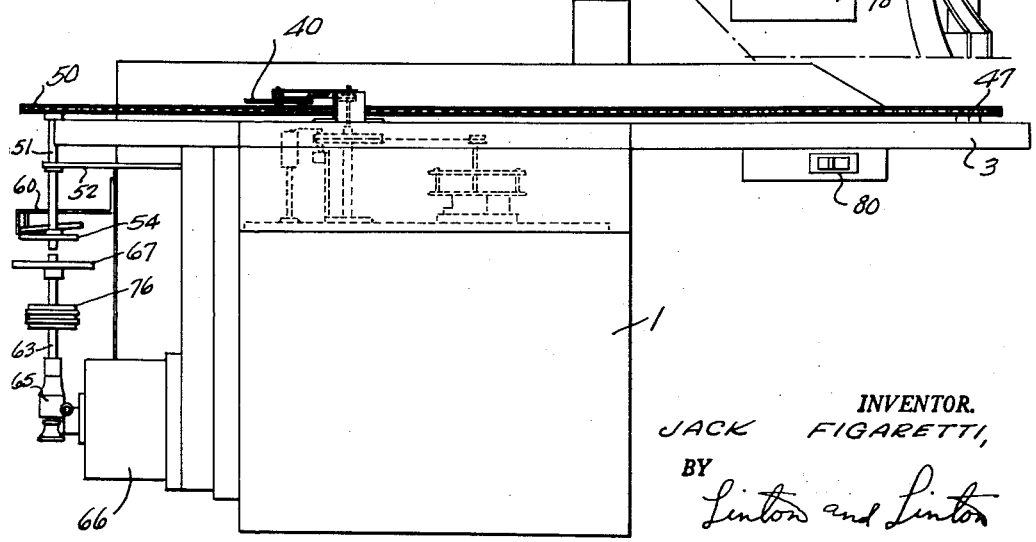
INVENTOR.
JACK FIGARETTI,
BY
Linton and Linton
ATTORNEYS

United States Patent Office 3,003,394
Patented Oct. 10, 1961

3,003,394
APPARATUS FOR PROJECTING INDICIA IN SERIES AT TIMED INTERVALS
Jack Figaretti, 202 Cleveland Ave., Wheeling, W. Va.
Filed Nov. 17, 1959, Ser. No. 853,608
7 Claims. (Cl. 88—28)

The present invention is concerned with an apparatus for projecting indicia under controlled conditions and particularly projecting one or more of a series of orders at a time and each for a given interval.

The principal object of the present invention is to provide an apparatus for projecting indicia from one location to a second with the indicia being projected for a given interval of time which is automatically controlled.

A further important object of the invention is to provide a projecting apparatus including automatically controlled and driven means for moving quickly attachable and detachable indicia carrying members to and from a projecting position with an indicator for denoting the time remaining for the projection of each indicia carrying member.

Another and equally important object of the invention is to provide an apparatus for projecting orders, for example, orders for meals from an area where the order is taken to an area where the order is to be completed and which order or a series of orders can be easily and quickly connected to the machine by one or more order takers as received, whereupon, the apparatus will automatically project each order for a predetermined time deemed sufficient for the order to be completed.

Figure 1:
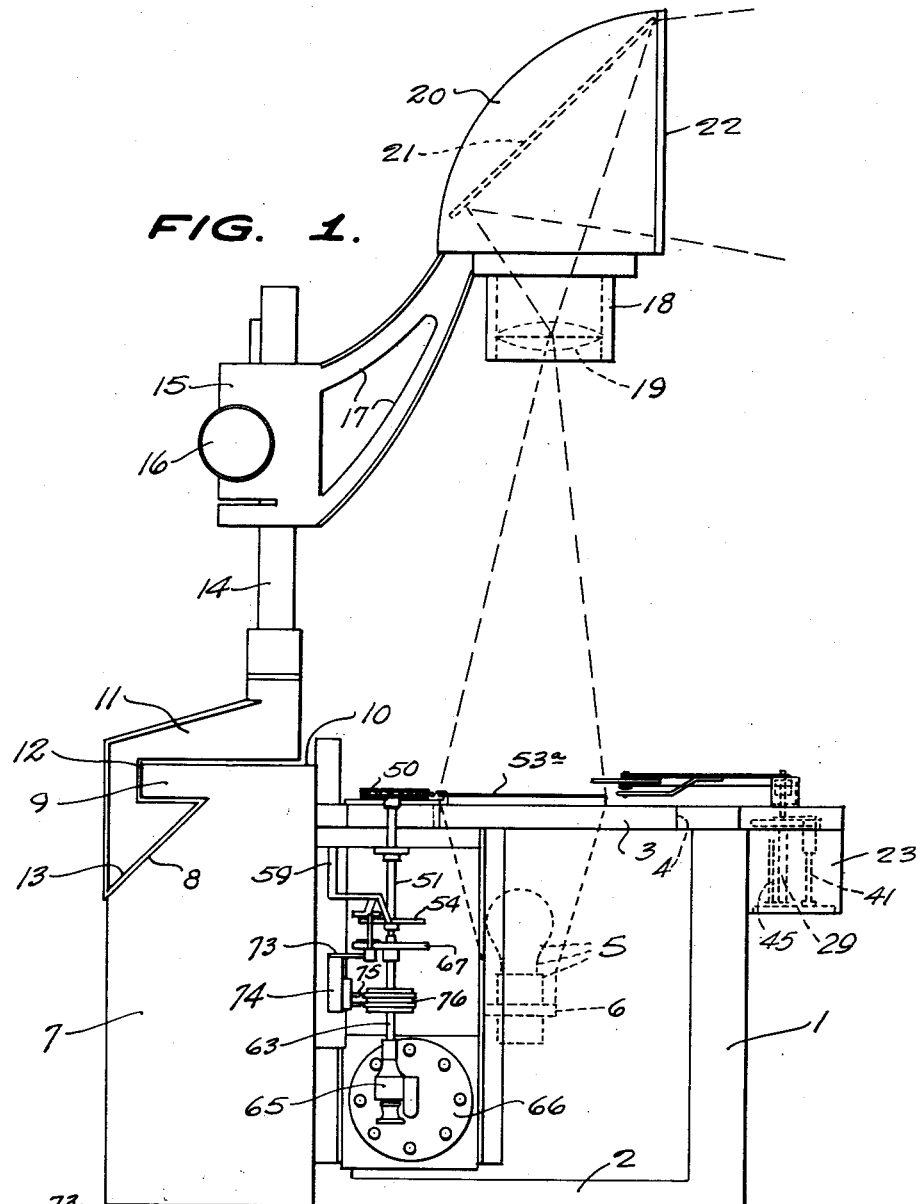
Figure 11:
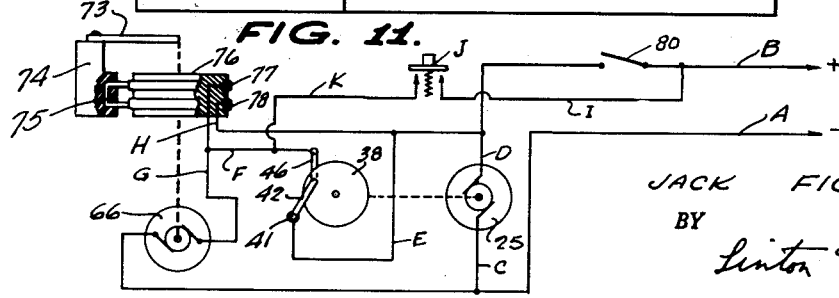

Further objects of the invention will be in part obvious and in part pointed out in the following detailed description of the accompanying drawings in which:

FIG. 1 is an end elevation of the present apparatus.
FIG. 2 is a top plan view of the apparatus.
FIG. 3 is a front elevation of the apparatus with a part thereof offset.
FIG. 4 is an enlarged detail view of the drive for the order carrying chain.
FIG. 5 is a cross-sectional view taken on line 5—5 of FIG. 4.
FIG. 6 is a cross-sectional view taken on line 6—6 of FIG. 4.
FIG. 7 is a cross-sectional view taken on line 7—7 of FIG. 4.
FIG. 8 is an enlarged detail view of an indicator and circuit controller forming a part of the present apparatus.
FIG. 9 is a side elevation of the device of FIG. 8.
FIG. 10 is an end view of the apparatus of FIG. 8, and
FIG. 11 is a wiring diagram for the drive mechanism of the present apparatus.

Referring now more particularly to the accompanying drawings wherein like and corresponding parts are indicated by similar reference characters, numeral 1 indicates a housing having a base 2 and a flat top 3. A light transmitting plate 4 is mounted flush on and through top 3. A lamp 5 connected to a source of electrical current is supported by bracket 6 within said housing and positioned for directing light upwardly through plate 4. The back 7 of said housing connected to bottom 2 and top 3 has a slanting face 8 above which is positioned a guide 9 with a flat top 10. A slide 11 is slidably mounted on top 10 and has a key way 12 for receiving guide 9 and a slanting bottom 13 slidably positioned on back face 8. An upright 14 is mounted upon said slide and has a carriage 15 slidably mounted thereon with a hand screw 16 in threaded engagement with said carriage positioned for engaging support 14 to retain carriage 15 in adjustable positions along said support. Arms 17 extend from said carriage and support a tubular member 18 in which is positioned a lens 19 for receiving light from plate 4. Arms 17 also support an open end casing 20 in which is positioned a reflector 21 at an angle to lens 19 for receiving light from said lens and projecting the same at right angles to the path of said light. Casing 20 has a transparent front 22 for the passage of light from said reflector.

A box 23 having a bottom 24 is mounted upon the front of housing 1 and contains an electric clock motor 25 as shown in FIG. 8 for driving a pulley 26 fixedly connected thereto at a given speed. An endless belt 27 extends around pulley 26 and also around a pulley 28 rotatably mounted upon a shaft 29 supported by said box bottom. Preferably, pulley 28 has a circumference six times the circumference of pulley 26, as will be explained hereinafter. Pulley 28 has a slotted hub 30 in which extends a shaft 31 connected to said hub by a key 32. Pulley 34 is fixedly mounted upon shaft 31 while said shaft is rotatably supported at its upper end by a bracket 33 fixedly mounted on box 23. A hollow arm 35 is fixedly mounted at one end upon bracket 33 and rotatably supports a pulley 36 at its outer end while an endless belts extends around both pulleys 34 and 36 which are of the same size. A shaft 38 is rotatably supported by the outer end of arm 37 and a bracket 39 extending from said arm with pulley 36 mounted on said shaft 40. A transparent disc 39 is fixedly connected to shaft 38 for rotation therewith and contains indicia in the form of a series of numbers thereon.

Box 23 further supports a shaft 41 on bottom 24 with a flexible electric conducting strip 42 fastened by screw 43 to the upper end of shaft 41 and extending above the upper face of pulley 28. A further shaft 45 is mounted on bottom 24 and has a toggle 46 pivotally mounted upon the upper end thereof which toggle is of an electrical conducting material. Pulley 28 has a contact 44 also of electrical contacting material extending therethrough and positioned for being simultaneously contacted by strip 42 and toggle 46. Pulley 28 is of an electrical insulating material while shafts 41 and 45 can be of a similar material or of a conducting material when bottom 24 is of an insulating material.

A stub axle 47 is mounted upon housing top 3 on one side of plate 4 with a sprocket 48 rotatably mounted thereon. A second sprocket 49 is positioned on the opposite side of plate 4 while an endless chain 50 extends around both said sprockets. A shaft 51 has sprocket 49 fixedly connected thereto with an arm 52 rotatably supporting said shaft.

Chain 50 has a series of hooks 53 fixedly connected thereto along its length. A series of light transmitting order blanks 53a are attachable to said hooks with each blank detachably connected to one hook.

As best shown in FIGS. 4–7 inclusive, a disc 54 having a stepped periphery formed by a semi-circular edge 55 offset from semi-circular edge 56 joined at one end by step 57 and at the opposite end by diametrically opposite step 58 is fixedly mounted on shaft 51. An L-shaped arm 59 is connected to back 7 of said housing and has a downwardly extending base 60 from which extends a finger 61 supporting a semi-circular guide band 62 alongside of the periphery of disc 54.

A shaft 63 rotatably supporting the lower end 64 of shaft 51 is driven through a gear box 65 by an electric motor 66.

A disc 67 is fixedly connected to shaft 63 and has a stub axle 68 extending laterally therethrough. An arm 69 is fixedly connected at one end to stub axle 68 and carries a lateral pin 70 at its free end while a spring 71 is also connected to said free end and by pin 72 to disc 67. Arm 69 and spring 71 are positioned on the upper face of disc 67 while an arm 73 is fixedly connected to stub axle 68 below said disc. A block 74 of electrical insulating material is fixedly connected to arm 73 at one end and has a U-shaped electrical contact 75 imbedded at its base in said block with the uprights extending laterally from said block, in contact with a pair of annular bands 77 and 78 carried in the periphery of a drum 76 supported by arm 79 on motor 66 but with shaft 63 extending therethrough but without connection thereto.

A switch 80 as shown in FIGS. 3 and 11 is carried on the front of top 3 for making and breaking the electrical circuit supplying current to the present device.

Wire A, as best shown in FIG. 11, is connected to one pole of a source of current and to one pole of the electric motor 66, wire B is connected to the other pole of the source of current and to contact band 78, while switch 80 is interposed in said wire. Wire C connects A to one pole of the motor 25, while wire D connects the other pole of said motor with wire B. Wire B is further connected by wire E to either the shaft 41 if a conductor or directly to the strip 42, while toggle 46 is connected by wire F to a wire G joining band 77 with the other pole of motor 66.

In the operation of the present device, switch 80 is closed sending a current to motor 25 and also to lamp 5. Thus pulley 26 through belt 27 rotates pulley 28. If motor 25 rotates, for example, one revolution per minute and pulley 28 is six times the circumference of pulley 26, then pulley 28 will rotate one revolution in six minutes. Thus belt 35 rotates disc 40 one revolution in six minutes and said disc can have number 1 to 6 thereon indicating each minute of the revolution. The light from lamp 5 passing through plate 4 and disc 40 projects the numbers on said disc to and through lens 19 to reflector 21 and from there through plate 22 to a screen not shown.

Disc 28 also carries contact 44 therethrough, and when the same engages both strip 42 and toggle 46 the circuit from wire E to wire F is completed and thus completes the connection of wire F through wire G to motor 66 causing the same to rotate. The operation of motor 66 rotates shaft 63 and thus disc 67, causing pin 70 to bear against the outside of guide band 62 pivoting stub axle 68 moving contacts 75 out of engagement with conducting bands 77 and 78. However, as soon as pin 70 completes its passage along guide band 62 it will contact step 58 pushing disc 54 a half a revolution until pin 70 again engages band 62. The rotation of disc 54 rotates sprocket 49 a half a revolution and moves chain 50 therewith.

One or more order takers can fill in one or more blanks 53a listing the order which, for example, could be an order for meals or for other goods and thereupon hooks each blank upon one of the hooks 53 which slides along top 3 over plate 4. The blanks are sized so that upon each movement of chain 50, which is the distance of the width of one blank, a new blank is presented on plate 4 in line with light 5 and lens 19 for being projected by reflector 20.

Thus the motor 66 is operated intermittently at six minute intervals to advance one more blank across the path of the light during such interval and to cross completely the plate 4 in about eighteen minutes. During such passage across plate 4 each blank is projected by reflector 20 to a screen at a remote position for the period of eighteen minutes to allow for the completion of the order by a person or persons viewing the same.

Contact 44, in accordance with the present example, completes the circuit for about five seconds in each revolution of pulley 28. Thus motor 66 is actuated until the contact is broken, which break occurs before motor 66 has completed one complete revolution of shaft 63 but not until after contact is made through contact rings 77 and 78. Thus when contact 75 completes the circuit with rings 77 and 78, motor 66 will continue to operate even though the contact between strip 42 and toggle 46 is broken. However, motor 66 will be stopped when pin 70 moves around guide band 62 until contact is again made by contact 44 with strip 42 and toggle 46. Thus the blanks 53a are automatically advanced at six-minute intervals across the face of plate 4 and disc 40 indicates the time remaining between each advancement.

It is to be appreciated that the sizing of the pulleys can be varied to vary the timing of the advancement of chain 50 as required.

The invention is capable of considerable modification and such changes thereto as come within the scope of the appended claims is deemed to be a part of the invention.

I claim:

1. An order projecting apparatus comprising a housing having a transparent top portion, a lens adjustably mounted on said housing above said transparent top portion, a source of illumination mounted in said housing in line with said transparent portion and said lens, at least one transparent member capable of having order indicia transcribed thereon, an endless conveyor moveably mounted on said housing, means for detachably connecting said member to said conveyor, said conveyor being positioned for presenting said member between said source of illumination and said lens, an electric motor, a source of electrical current, a circuit connecting said motor and said current, a circuit make and break mechanism interposed in said circuit, a driven timer operatively connected to said mechanism for opening and closing said circuit at given intervals for operating said motor for predetermined periods, means operatively connecting said motor to said conveyor only during a portion of a turn of said motor for driving said conveyor intermittently and means operatively connected to said connecting means capable of connecting said motor to said current only during the driving of said conveyor.

2. An order projecting apparatus as claimed in claim 7 wherein is included a time indicator comprising a transparent disc with numbered indicia thereon, an arm supported on said housing having said disc rotatably mounted thereon above said transparent top portion for projecting said numbered indicia through said lens and means connecting said disc to said circuit make and break mechanism for being rotated thereby at a corresponding speed.

3. An order projecting apparatus as claimed in claim 1 wherein said circuit make and break mechanism consists of a pulley rotatably supported on said housing, a flexible arm connected to one pole of said circuit and supported on said housing on one side of said pulley, a toggle arm connected to another pole of said circuit and positioned on the other side of said pulley, an electrical contact extending through said pulley for engaging said flexible arm and said toggle arm during a portion of the rotation of said pulley closing said circuit at that time and means connecting said pulley to said timer for being rotated thereby at a given speed.

4. An order projecting apparatus as claimed in claim 1 wherein said means operatively connecting said motor to said conveyor consists of a pair of shafts one connected to said motor and the other to said conveyor, a pin-pivotally connected to said motor shaft, a disc connected to said conveyor shaft and having a stepped periphery, resilient means tending to retain said pin in contact with said disc periphery and engaging the steps thereof for rotating said disc, a curved guide bar supported on said housing around a portion of said disc periphery for being engaged by said pin which is thereby moved out of driving connection with said disc periphery during this portion of the rotation of said motor shaft.

5. An order projecting apparatus as claimed in claim 1 wherein said means for connecting said motor to said current during the driving of said conveyor consists of a pair of fixed circular electrical contacts with one contact connected to a pole of said motor and the other contact connected to a pole of said source of current, a shaft connected to said motor for being driven thereby, a pin pivotably connected to said shaft, a pair of connected contacts connected to said pin for movement therewith and positioned for at times engaging said circular contacts for closing the circuit therethrough, means for driving said conveyor capable of being engaged by said pin for movement therewith and means for pivoting said pin out of engagement with said driving means during a portion of the rotation of said shaft and thereby said pair of connected contacts from said circular contacts and resilient means tending to pivot said pin moving said connected contacts into engagement with said circular contacts.

6. An order projecting apparatus comprising a flat top housing having an opening therein, a light emitting partition mounted in said housing opening, a light source positioned in said housing beneath said portion, a pair of sprockets rotatably mounted on said housing top each at an opposite side of said partition, an endless flexible member extending around said sprocketing, and adjacent said partition, fastening elements connected to said member along the length thereof, a plurality of transparent blanks each capable of connection to one of said fastening elements for being moved thereby over said partition permitting light therefrom to pass through said blank, a support adjustably mounted on said housing, a casing supported by said support above said housing top, a lens in said casing for receiving light from said source thereof, adjustable reflector in said casing for receiving light from said lens and directing the same at an angle thereto from said casing, means mounted on said housing and connected to one of said sprockets for rotating the same intermittently and through a given angle of rotation for moving said blanks over said partitions one at a time and each for a given period.

7. An order projecting apparatus as claimed in claim 6 including a transparent disc having indicia thereon being rotatably supported above said partition for permitting light from said source to pass therethrough to said lens, an electric motor connected to said source of current, means connecting said motor to said disc for rotating said disc at a given speed, an electric switch, means driven by said motor for making and breaking said switch and means connecting said switch to said sprocket rotating means for starting and stopping the same to provide said intermittent rotation of said sprocket.

References Cited in the file of this patent

UNITED STATES PATENTS

| | | |
|---|---|---|
| 2,314,222 | Konig | Mar. 16, 1943 |
| 2,824,490 | Fitzgerald | Feb. 25, 1958 |
| 2,834,250 | Stefani | May 13, 1958 |